Aug. 12, 1958 J. RABINOW 2,847,502

TELESCRIBING APPARATUS

Filed April 2, 1956 2 Sheets-Sheet 1

JACOB RABINOW
INVENTOR.

TELESCRIBING APPARATUS

Filed April 2, 1956 2 Sheets-Sheet 2

JACOB RABINOW
INVENTOR.

2,847,502

TELESCRIBING APPARATUS

Jacob Rabinow, Washington, D. C., assignor to Telautograph Corporation, Los Angeles, Calif., a corporation of Virginia Application April 2, 1956, Serial No. 575,574

3 Claims. (Cl. 178—18)

This invention relates to telescribing apparatus and more particularly to telescribing apparatus for producing signals accurately representing the movements of a stylus along a platen.

As in all ages, communication between different men and different organizations is very important. Communication between different men and different organizations is especially important now because of the accelerated pace at which events in various fields including business are taking place. Various types of communication exist which have wide utility. These types of communication include the telephone and the telegraph. Sometimes, however, these forms of communication are not adaptable to certain situations. For example, an identification of a customer's signature in a bank cannot be easily made unless the signature can be visually presented. As another example, a factory manager may desire to communicate instantly with a group of supervisors at different positions in a large factory and may desire to identify himself by his signature. In such instances, a visual presentation of a written message may be necessary.

Telescribing apparatus has been built to record at one position information transcribed at a second position. The telescribing apparatus includes a stylus at a transmitting station, means including first linkages for producing signals representing the movements of the stylus along a first axis and means including second linkages for producing signals representing the movements of the stylus along a second axis. The first and second signals are transmitted to a receiving station and are used to control the positioning of a stylus at the receiving station.

Sometimes it is necessary to record with great accuracy at the receiving station the movements of the stylus at the transmitting station. For example, the identification of signatures at a bank may often require that the signatures at the transmitting station be duplicated with great accuracy at the receiving station. Certain problems have sometimes arisen in the past to impede the recording of messages with great accuracy at the receiving station. One of these problems has resulted from the fact that the movements of the stylus at the transmitting station along one axis have affected the disposition of the stylus along the second axis. Since the disposition of the stylus along each axis is at least in part dependent upon changes in the disposition of the stylus along the other axis, errors in the recording of messages at the receiving station have resulted.

Another problem has resulted from the phenomenon called "parallax." This phenomenon results from movements of the transmitting stylus which do not affect the position at which the stylus is contacting the platen. For example, the stylus can be rotated without changing the position at which the stylus is contacting the platen. Since no movements of the stylus along the platen have been obtained, the positions of the various linkages also should not be changed even as the stylus is being rotated. However, the linkages are often attached to the stylus at a position removed from the point of contact between the stylus and the platen. Because of this, errors are often obtained from shifts in the position in which the stylus is manually held.

This invention provides apparatus for overcoming the above difficulties. The invention includes apparatus for producing independence in the disposition of linkage members along each axis even as the stylus is moved along the other axis. The invention also includes a linkage arrangement for eliminating any adverse effects of "parallax." The apparatus constituting this invention overcomes the above disadvantages by the use of simple mechanical structure.

Figure 1:
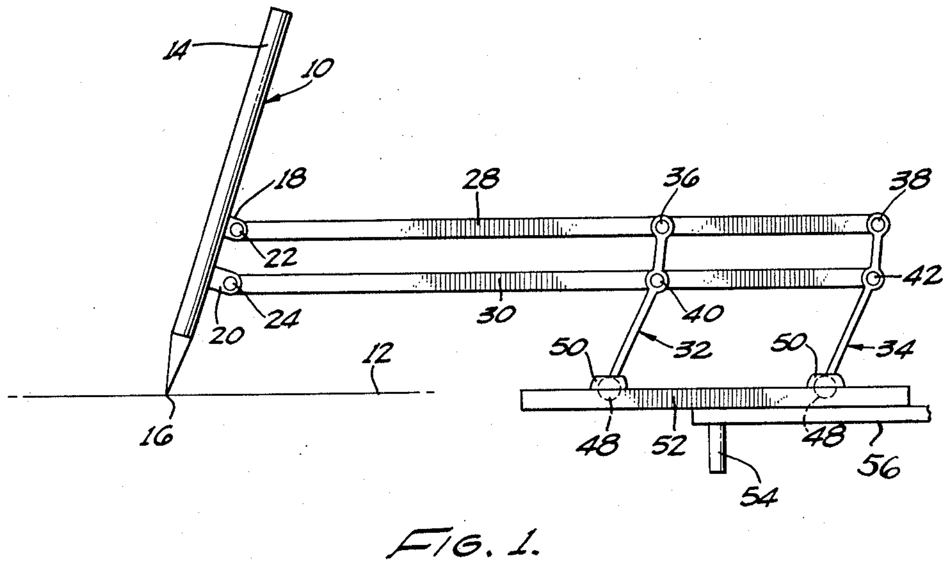
Figure 1 is an enlarged fragmentary elevational view of a stylus and apparatus associated with the stylus for eliminating "parallax."
Figure 2:
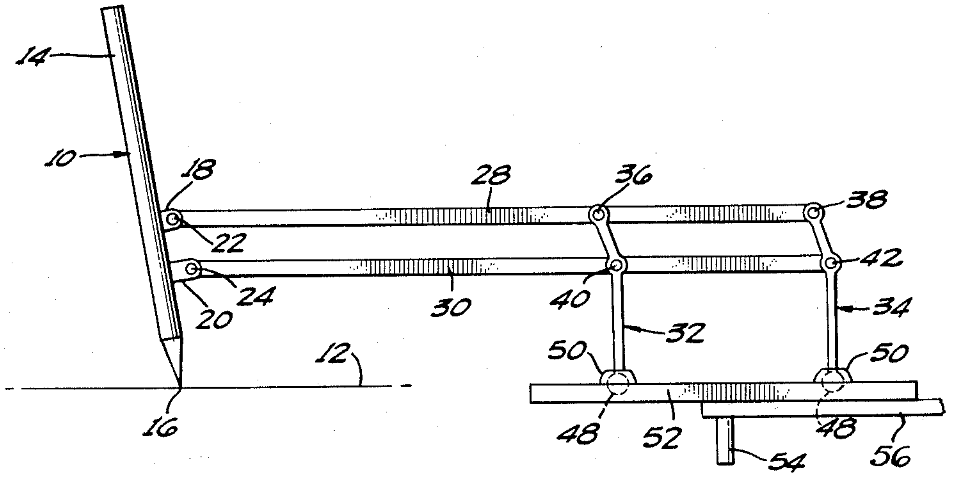
Figure 2 is an enlarged fragmentary elevational view similar to that shown in Figure 1 and illustrates the disposition of the various members shown in Figure 1 when the stylus has been moved to a second position.

In the embodiment of the invention shown in Figures 1 and 2, a stylus 10 is adapted to move along a platen 12 to record a message on the platen. The stylus 10 may be provided with a tubular portion 14 which tapers at its bottom end to a thin tip 16. A pair of lugs 18 and 20 are provided in the tubular portion 14 of the stylus 10. Pivot pins 22 and 24 are respectively provided in the lugs 18 and 20. The pivot pins 22 and 24 are disposed so that the line between the centers of the pivot pins is substantially parallel to the axis of the tubular portion 14.

Arms 28 and 30 are respectively coupled to the lugs 18 and 20 for pivotal movement on the pins 22 and 24. The arms 28 and 30 are disposed in substantially parallel relationship to each other and are disposed in a direction substantially parallel to the platen 12.

Linkages 32 and 34 are attached at their upper ends as at 36 and 38 to the arm 28 for pivotal movement relative to the arm. The linkages 32 and 34 are attached to the arm 28 at a pair of spaced positions. The linkages 32 and 34 extend downwardly toward the arm 30 in a direction substantially parallel to the axis of the tubular portion 14 of the stylus 10. The linkages 32 and 34 are respectively attached as at 40 and 42 to the arm 30 for pivotal movement relative to the arm.

The linkages 32 and 34 extend below the arm 30 in a direction substantially parallel to a line extending from the pin 24 to the tip 16 of the stylus 10. The linkages 32 and 34 have balls 48 at their bottom end. The balls 48 are disposed within sockets 50 extending upwardly from a coupling member 52. In this way, the linkages 32 and 34 can drive the coupling member 52 and can also pivot with respect to the coupling member.

A pin 54 (Figures 1, 2 and 3) extends downwardly from the coupling member 52. The pin 54 supports a pair of arms 56 and 58 (Figure 3) in fixed relationship with respect to the pin 54. The arms 56 and 58 are preferably supported on the pin 54 at a position vertically contiguous to the coupling member 52. The arms 56 and 58 are disposed along a pair of transverse axes and are preferably disposed in substantially perpendicular relationship to each other. A rack gear 60 is fixedly attached to the outer end of the arm 56 and is provided with a plurality of teeth 62 defined by grooves extending in a direction substantially parallel to the arm 58. In like manner, a rack gear 64 is fixedly attached to the outer end of the arm 58 and is provided with a plurality of teeth 65 defined by grooves extending in a direction substantially parallel to the arm 56.

An arm 66 extends from the outer end of the rack gear 60 in fixed relationship to the rack gear and in substantially parallel relationship to the arm 58. The arm 66 supports at its outer end a rack gear 68 having a plurality of teeth 70 which are substantially parallel to and aligned with the teeth 65 in the rack gear 64. A pinion gear 72 is in mesh with the rack gears 64 and 68. The pinion gear 72 is provided with a cylindrical configuration and is disposed in substantially parallel relationship to the arm 56. The pinion gear 72 is provided with a plurality of teeth 74 defined by grooves extending in a direction substantially parallel to the arm 56. The pinion gear 72 is mechanically coupled to the movable arm of a potentiometer 76 so as to produce a variable voltage in the potentiometer in accordance with the movements of the gear.

In like manner, an arm 80 extends from the outer end of the rack gear 64 in fixed relationship to the rack gear and in substantially parallel relationship to the arm 56. The arm 80 supports at its outer end one end of a rack gear 82 having teeth 83 which extend in a direction substantially parallel to the rack gears 64 and 68. The other end of the rack gear 82 is attached to the rack gear 68. In this way, the arms 56, 58, 66 and 80 and the rack gears 60, 64, 68 and 82 form a frame in which the various parts of the frame are fixedly positioned relative to one another.

A pinion gear 84 is in mesh with the rack gears 60 and 82. The pinion gear 84 is disposed in a direction substantially parallel to the rack gears 64 and 68 and is provided with a plurality of teeth 86 defined by grooves extending in a direction substantially parallel to the rack gears 64 and 68. The pinion gear 84 is mechanically coupled to the movable arm of a potentiometer 88 so as to produce a variable voltage in accordance with the movements of the pinion gear.

Various movements of the stylus 10 will now be considered. The first movements of the stylus 10 may occur toward the right or left in Figure 1 such that the stylus remains in a configuration substantially parallel to that shown in Figure 1. As will be seen, such movements of the stylus 10 are translated into corresponding movements of the stylus tip 16 along the platen 12.

Since the stylus 10 remains in a direction substantially parallel to its original direction, the arms 28 and 30 move through equal distances. By moving the arms 28 and 30 through equal distances, the linkages 32 and 34 remain fixedly positioned relative to each other and follow the movements of the arms. Because of the fixed positioning of the linkages 32 and 34 relative to each other, the linkages drive the coupling member 52 through distances corresponding to the movements of the stylus tip 16 along the platen 12. In this way, the coupling member 52 accurately follows the displacements of the stylus 10 along the platen 12.

It may sometimes happen that the stylus 10 may be moved without affecting the position at which the tip 16 of the stylus 10 is contacting the platen 12. This may occur as a result of shifts in the position held in the hand of the writer. For example, the stylus 10 may be rotated in the plane of the paper about the tip 16 of the stylus as a fulcrum. This may be seen by comparing the positions of the stylus 10 in Figures 1 and 2. Such rotation should not result in the recording of any message since the tip 16 of the stylus 10 is not being moved.

When the stylus 10 is rotated about the tip 16 of the stylus as a fulcrum, the upper positions on the stylus move through a greater distance than the lower positions on the stylus. This causes the lug 18 and the pivot pin 22 to move through greater distances than the lug 20 and the pivot pin 24. Since the arms 28 and 30 respectively follow the movements of the pins 22 and 24, the arm 28 moves through a greater distance than the arm 30.

Because of the differential movements of the arms 28 and 30, pivotal movements are produced in the linkages 32 and 34. The pivotal movements are produced about the balls 48 as a fulcrum. By producing such pivotal movements of the linkages 32 and 34, the rotational movements of the stylus 10 do not become translated into movements of the coupling member 52.

It may also sometimes happen that the stylus 10 may be rotated in a plane perpendicular to the plane of the paper without affecting the position at which the tip 16 of the stylus 10 is contacting the platen 12. When such a rotational movement of the stylus 10 occurs, the rotational movement of the stylus is transmitted through the arms 28 and 30 to the linkages 32 and 34. This causes the linkages 32 and 34 to pivot about the balls 48 as a fulcrum in a direction perpendicular to the plane of the paper. By pivoting the linkages 32 and 34 in this manner, the rotational movements of the stylus 10 in a plane perpendicular to the plane of the paper do not become translated into corresponding movements of the coupling member 52.

It will be seen from the above discussion that only the movements of the stylus tip 16 along the platen 12 are translated into corresponding movements of the coupling member 52. Any rotational movements of the stylus 12 about the tip 16 as a fulcrum become absorbed by the arms 28 and 30 and the linkages 32 and 34 so as not to be translated into movements of the coupling member 52. In this way, the movements of the coupling member 52 accurately indicate the message to be recorded.

Figure 3:
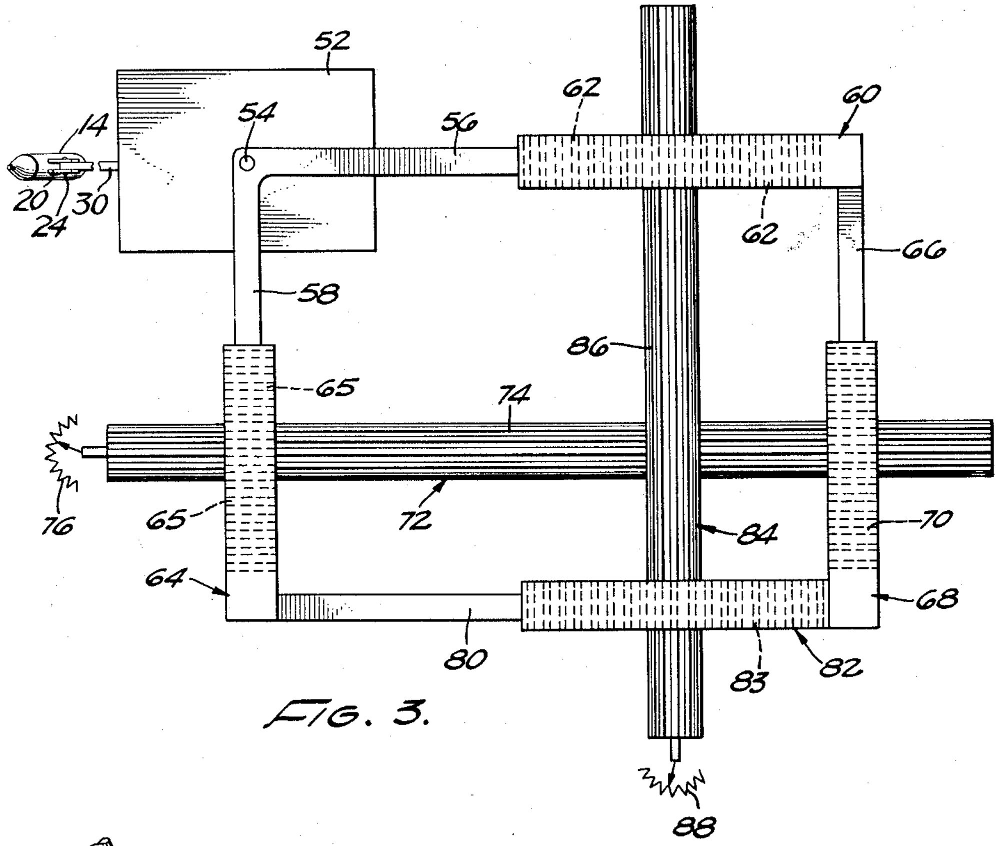
Figure 3 is an enlarged fragmentary plan view of apparatus coupled to the apparatus shown in Figures 1 and 2 for producing first and second signals respectively representing the movements of the stylus along first and second axes such that changes in the first signals do not affect the characteristics of the second signals and vice versa.

As the coupling member 52 moves, it drives the frame formed in Figure 3 by the arms 56, 58, 66 and 80 and by the rack gears 60, 64, 68 and 82. The frame formed by these members is driven by the coupling member 52 since the frame is connected to the pin 54 (Figures 1, 2 and 3). Because of the association between the various members in the frame and the association between the various members in the frame and the pinions 72 and 84, all of the parts of the frame have the same movement. For example, all of the arms and rack gears in the frame move to the right in Figure 3 when the coupling member is driven toward the right.

When the frame formed by the various arms and rack gears moves toward the right in Figure 3, the rack gears 60 and 82 move along the pinion 84 and drive the pinion in a clockwise direction in that figure. The movable contact of the potentiometer 88 moves with the pinion 84 so as to vary the voltage produced on the movable contact of the potentiometer. The voltage on the movable contact of the potentiometer 88 can be varied in this manner when a substantially constant voltage is applied between the stationary contacts of the potentiometer.

The variable voltage produced on the movable contact of the potentiometer 88 can be transmitted to a receiving station in a manner similar to that described in co-pending application Serial No. 552,542, filed December 12, 1955, by Carl F. Anderson et al. The variable voltage can be decoded at the receiving station to control the positioning of a stylus at the receiving station. In this way, the movements of the stylus 10 along the axis of the platen 12 corresponding to that formed by the arms 56 and 80 can be accurately reproduced at the receiving station.

The movements of the frame toward the right or left in Figure 3 do not affect the disposition of the pinion 72 in that figure. This results from the fact that the teeth 74 in the pinion 72 extend in a direction substantially parallel to the arms 56 and 80 and the rack gears 60 and 82. Since the disposition of the pinion 72 is not affected by movements of the frame toward the right in Figure 2, the amplitude of the signals representing the disposition of the stylus 10 in a vertical direction in Figure 3 remains constant. This is important in insuring that the stylus at the receiving station accurately follows the movements of the stylus 10.

In like manner, the frame shown in Figure 3 follows the movements of the coupling member 52 (Figures 1 and 2) in a direction corresponding to a vertical direction in Figure 3. As the frame moves in a vertical direction in Figure 3, the rack gears 64 and 68 drive the pinion 72 and the movable contact of the potentiometer 76 such that the voltage on the movable contact of the potentiometer becomes correspondingly varied. In this way, a variable voltage can be transmitted to the receiving station to control the positioning of the stylus at the receiving station along one axis.

The positioning of the stylus at the receiving station along the horizontal axis in Figure 3 is not affected by variations in the voltage from the potentiometer 76 since the pinion 84 is not affected by movements of the rack gears 64 and 68 and the pinion 72. This results from the disposition of the teeth 86 in the pinion 84 in a direction parallel to the rack gears 64 and 68.

Figure 4:
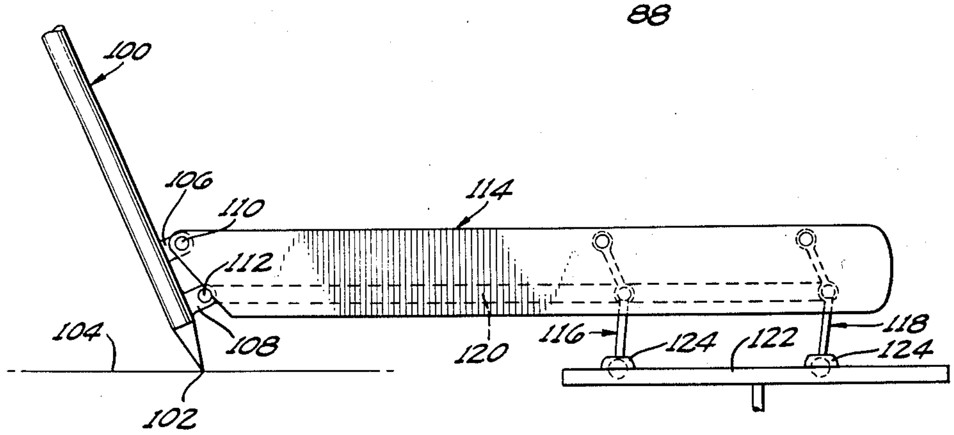
Figure 4 is an enlarged fragmentary elevational view illustrating a second embodiment of apparatus for eliminating "parallax."

Another embodiment of the invention for eliminating "parallax" is shown in Figure 4. The embodiment shown in Figure 4 includes a stylus 100 which may be constructed in a manner similar to the stylus in Figure 1. The stylus 100 has a tip 102 which is adapted to record messages on a platen 104. Lugs 106 and 108 extend from the stylus 100 at spaced positions along the length of the stylus and respectively support pins 110 and 112.

A channel member 114 is pivotally supported on the pin 110. The channel member 114 has a length corresponding to the lengths of the arms 28 and 30 in Figures 1 and 2 and has a substantially U-shaped cross section in a plane substantially perpendicular to the plane of the paper. The open end of the U may be at the bottom of the channel member in Figure 4. Linkages 116 and 118 are attached to the channel member 114 at spaced positions on the channel member along a horizontal line extending from the pin 110. The linkages 116 and 118 are attached to the channel member 114 at a position near the top of the channel member. The linkages 116 and 118 extend downwardly in a direction substantially parallel to the axis of the stylus 10 for a portion of their length.

An arm 120 is attached to the pin 112 at one end. The arm 120 extends in a horizontal direction along the channel member 114 between the pair of parallel legs defining the sides of the U-shaped configuration of the channel member. The arm 120 is attached to the linkages 116 and 118 at intermediate positions along the linkages but is not attached to the channel member 120. At positions below the arm 120, the linkages 116 and 118 are disposed in a direction substantially parallel to the line between the pin 112 and the tip 102 of the stylus 100 and coupled to a member 122. The associations between the linkages 116 and 118 and the coupling member 122 may be by ball-and-socket joints 124 similar to those shown in Figures 1 and 2 described above.

When the stylus 100 is moved along the platen 104 and is maintained in a substantially constant direction, the movements of the stylus are translated into corresponding movements of the channel member 114 and the arm 120. The channel member 114 and the arm 120 remain in substantially constant relationship to each other since the stylus 100 is being maintained in a fixed plane. This causes the linkages 116 and 118 to be maintained in a fixed plane such that the movements of the stylus 100 are translated into corresponding movements of the coupling member 122. The movements of the coupling member 122 may be converted by the apparatus shown in Figure 3 or by any other suitable apparatus into signals having characteristics related to such movements.

It may sometimes happen that the stylus 100 may be moved without affecting the position at which the tip 102 of the stylus 100 is contacting the platen 104. For example, the stylus 100 may be rotated in the plane of the paper about the tip 102 as a fulcrum. When this occurs, the pins 110 and 112 travel through different horizontal distances in Figure 4 since they have different radii from the tip 102 of the stylus. Because of this difference in movement, the channel member 114 has a differential movement with respect to the arm 120. This differential movement causes the linkages 116 and 118 to pivot about the coupling member 120 as pivot positions.

Since the linkages 116 and 118 pivot about the coupling member 120, rotary movements of the stylus 100 in the plane of the paper are not translated into movements of the coupling member. Pivotal movements of the stylus 100 in a plane perpendicular to the plane of the paper are also not translated into movements of the coupling member 120 because of the ball-and-socket couplings 124 provided between the linkages 116 and 118 and the coupling member 120.

It should be appreciated that the apparatus shown in Figure 3 for providing independent movements of linkages along two transverse directions does not have to be used with the apparatus shown in Figures 1 and 2 for eliminating "parallax." Nor does the apparatus shown in Figure 3 have to be used with the apparatus shown in Figure 4. For example, the apparatus shown in Figure 3 can be used by itself or with other apparatus. It should also be appreciated that the apparatus shown in Figures 1 and 2 does not have to be used with the apparatus shown in Figure 3 but can be used independently or with other apparatus. The apparatus shown in Figure 4 can also be used independently or with apparatus different from that shown in Figure 3.

It should be further appreciated that the embodiment shown in Figure 3 is included only by way of example and that various modifications can be made in this embodiment. For example, the arms, such as the arms 56, 58, 66 and 80, are shown in Figure 3 as having a substantial width. Actually, the arms can be thin wires and could even be hinged at the four corners such as the corner between the arms 56 and 58.

The embodiment shown in Figure 3 may also be modified in another way. This modification may be obtained by making the racks 62, 64, 68 and 82 tubular. This would cause each rack to look like a screw with zero lead. The advantage of this construction would be that it would reduce friction by minimizing the areas of contact between the racks and their associated pinions. For example, friction between the pinion 72 and the racks 64 and 68 would be minimized as the racks slid along the pinion.

The friction would be further reduced by extending the arms along the full lengths of the frame. For example, the arm 56 could extend along the full length of the frame between the arms 58 and 66. The racks could then be mounted on the arms for rotary movement relative to their associated arms. For example, the rack 60 could be mounted on the arm 56 for rotary movement relative to the arm. A small thrust bearing could also be used at each end of each rack. This would cause the racks to rotate as they slid along their respective pinions. For example, the racks 64 and 68 would rotate as they slid along the pinion 72 during a movement of the frame toward the right in Figure 3. By producing such a rotary movement of the racks 64 and 68, friction between the racks and the pinion 72 would be minimized.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination with a stylus at a telescribing station for providing signals representing the movements of the stylus with respect to a platen in first and second directions, a coupling member, means including a pair of arms pivotally connected to the stylus and a pair of linkages pivotally coupling the arms to the coupling member for translating movements of the stylus along the platen into corresponding movements of the coupling member, a frame including at least first and second racks disposed in driven relationship to the coupling member for movements in accordance with the movements of the coupling member, first and second pinions each disposed in driven relationship to a different one of the racks to receive movements independently of the movements of the other pinion, and first and second potentiometers each disposed in driven relationship to a different one of the pinions to provide a voltage having an amplitude variable in accordance with the movements of its associated pinion to represent the movements of the stylus in a different one of the first and second directions.

2. In combination with a stylus at a telescribing station for providing signals representing the movements of the stylus with respect to a platen in first and second directions, first and second arms attached at spaced positions on the stylus in pivotable relationship to the stylus and extending from the stylus in substantially parallel relationship to each other and to the platen for differential movement in accordance with variations in the positioning of the stylus not affecting the positioning of the stylus on the platen, a coupling member disposed in substantially parallel relationship to the platen for movement with the stylus along the platen, and first and second linkages each connected at one end to the first arm and at the other end coupled to the coupling member and pivotably coupled to the second arm at an intermediate position for transferring to the coupling member the movements of the stylus along the platen and for absorbing the movements of the stylus not translated into movements along the platen.

3. In combination with a stylus at a telescribing station for providing signals representing the movements of the stylus with respect to a platen in first and second directions, first and second arms connected to the stylus at spaced positions on the stylus and disposed in substantially parallel relationship to each other to follow the movements of the stylus, first and second linkages each connected at first positions to the first arm and at second positions to the second arm and disposed in substantially parallel relationship to each other and in pivotable relationship to the first and second arms to follow the movements of the stylus along the platen and to obtain pivotal movements upon a differential movement of the first and second arms resulting from movements of the stylus without corresponding movements of the stylus along the platen, and a member coupled to the first and second linkages to receive movements only in accordance with the movements of the stylus along the platen.

References Cited in the file of this patent

UNITED STATES PATENTS

| | | |
|---|---|---|
| 2,141,388 | Harrison et al. | Dec. 27, 1938 |
| 2,413,300 | Dunn et al. | Dec. 31, 1946 |
| 2,462,904 | Rosen | Mar. 1, 1949 |
| 2,623,943 | Adler | Dec. 30, 1952 |